Jan. 29, 1924.
H. J. ANDREWS ET AL
1,482,105
TRUCK
Filed March 22, 1922
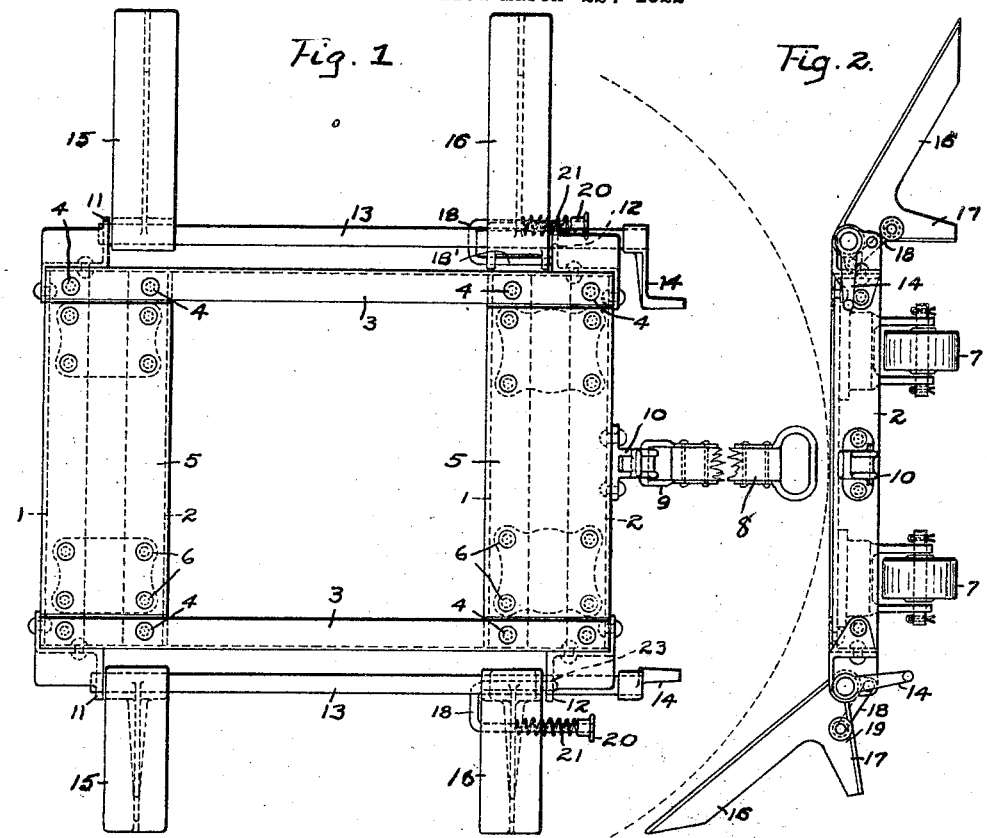
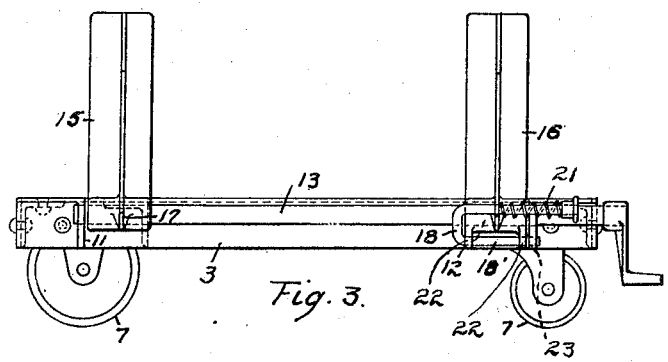
WITNESS:
E. E. Berry
INVENTORS.
H. J. Andrews and
J. M. Landenberger
BY
Elwin M. Hurley
ATTORNEY.

Patented Jan. 29, 1924.

1,482,105

UNITED STATES PATENT OFFICE.

HENRY J. ANDREWS AND JOHN M. LANDENBERGER, OF FORT WAYNE, INDIANA.

TRUCK.

Application filed March 22, 1922. Serial No. 545,695.

*To all whom it may concern:*

Be it known that we, HENRY J. ANDREWS, and JOHN M. LANDENBERGER, citizens of the United States, residing at Fort Wayne, in the county of Allen and State of Indiana, have invented a new and useful Truck, of which the following is a specification.

The invention relates to trucks adapted primarily for use in the handling of cylindrical objects, such as rolls of paper barrels, &c., but adapted for use in the handling of various other objects. In the handling and moving of rolls of paper at the paper mills and at the printing offices the common practice is to roll the same on the floor and in order to change the direction of its travel it is necessary to turn the roll. This turning movement frequently injures the outer layers of the paper roll so that a considerable loss is sustained in the necessary handling of the rolls. This loss is frequently sustained in the loading and unloading of the rolls in and from a freight car, where after the roll has passed through the door it is necessary to turn it in order to properly fill the car or to turn it in unloading in order that the roll may pass through the door. Where the rolls are heavy several men are required to handle the rolls to move them from place to place.

The object of our invention is to provide a truck on which various objects may be easily transported with little liability of injury, the truck being readily moved in any direction without disturbing the objects.

Another object is to provide a truck with means by which cylindrical objects may be readily rolled thereon and retained thereon during transportation.

The invention is accomplished by the embodiment thereof illustrated in the drawings in which—

Figure 1 is a plan view of a truck embodying the invention; Fig. 2 a front elevational view of the same and Fig. 3 a side elevational view.

Referring to the embodiment of the invention illustrated in the drawings, the frame of the truck is formed of suitable material preferably of angle bars, two bars 1 and 2 at each end and a side bar 3 at each side, the side bars being secured to the end bars by the bolts 4. One arm of each side bar rests on the top side of the end bars, and in order that the top surface of the frame shall be smooth and free from obstructions a plate 5 is bolted to each pair of end bars 1 and 2 by the bolts 6, the plate having the required thickness corresponding to the thickness of the overlying arms of the side bars. All the bolts are countersunk. Hence since the plates substantially abut at their opposite ends the opposed faces of the side bars, the object supporting surface of the frame is flat and smooth and there is nothing thereon to injure the object which may be deposited on the truck for transportation. A suitable number of castors 7 are mounted on the frame for movably supporting the frame, the mounting being of the swivel type so that the truck may be moved in any direction with ease.

A tongue 8 is detachably mounted at one end of the frame—we will designate the said end as the front end for clearness of description. A link 9 is secured to the rear end of the tongue and is adapted to be engaged on a hook-shaped member 10 secured to the forward end of the frame. Hence the tongue may be readily attached or detached as desired.

Two bearings 11 and 12 are secured to and project laterally from each side bar 3 of the frame and each set of bearings revolubly supports a shaft 13 having a crank 14 secured to its forward end. Two arms 15 and 16 are secured to the shaft and they are of a selected length to engage, at their free ends, the floor or other surface upon which the truck may be at rest. In this position the arms serve as skids upon which a cylindrical object may be rolled to load the same onto the truck or to unload the same from the truck. A leg 17 projects at a suitable angle from each arm 15, 16 and is adapted to engage the floor should the truck tilt while the object is being loaded or unloaded and thereby check the said tilting movement and prevent all accidents. Normally the said leg does not engage the floor but a very slight tilting movement of the truck frame will cause said engagement to take place.

By depressing the crank 14 by the foot the shaft 13 and its arms 15 and 16 are caused to rotate, the arms rising to a selected position where they form guards for the object deposited on the truck and prevent the same from rolling off the truck.

In order to lock the arms in their elevated position we provide a latch mechanism comprising a U-shaped member 18 having its long arm slidably mounted in the web 19 or other part of the forward arm 16. A knob 20 is secured to the forward end of the said long arm and a spring 21 bears at one end against the said knob and at the other end against the web to oppose all rearward movement of the member 18. The short arm 18' of the member is loosely extended through an opening in the lugs 22 formed on the inner end of the arm 16, the forward end of said arm 18' being adapted to ride on the rear side of the bearing plate 12 and to engage in an aperture 23 formed at the selected point in said plate. The position of the aperture in the plate 12 is determined, of course, by the position to which the adjustable arms 15 and 16 are to assume when elevated. The spring 21 causes the short arm 18' to engage in the aperture when the said arm is moved into register with the aperture. To release the arms for causing them to drop by gravity to form skids the operator merely presses inwardly on the latch member with his foot to disengage the same from the bearing plate. The descent of the adjustable arms causes the shaft 13 to rotate and to elevate the crank or foot pedal 14 to a position substantially parallel with the forward end of the frame. The elevating movement of the arms is therefore accomplished with ease by merely depressing the pedal with the foot.

A relatively few men are required to load a heavy object on the truck and to transport the same from place to place and the danger of injury to the object, especially where it is a roll of paper, is reduced to a minimum, since the roll is not disturbed on the truck while being transported in any direction. The surfaces of the arms, when the arms are functioning as skids, are substantially continuous with the smooth surface of the truck so that there is no danger of injuring the object as it passes onto or from the skids.

When the skids are functioning as guards the latch mechanism retains the arms so that any stress placed on the latter due to the load on the truck shifting sidewise thereon is transmitted directly to the frame of the truck. Hence all torque in the shafts that carry the arms is eliminated.

It will be apparent that additional apertures 23 may be formed in the bearing plates 12 at selected points in order to control the angularity of the adjustable arms with respect to the truck. Should the arms be locked in horizontal position they would increase the object supporting surface of the truck and enable large sheets of material or other objects to be transported on the truck.

It is thus apparent that the smooth and even top surface of the truck permits large objects to be supported thereon with no danger of injury to those objects thereby, and that the truck with its load is readily handled for transporting the objects to any desired point, the objects being readily loaded or unloaded onto or from the truck with a minimum of effort.

What we claim is:

1. A truck comprising a wheeled frame, adjustable members rotatably mounted upon opposite sides of the frame, means to releasably lock said members in elevated position, said members when released being adapted to lower into engagement with the ground to form skids for loading or unloading the truck, means on the members adapted to engage the ground to prevent overturning of the truck while loading or unloading the same and means to elevate the members to form guards on the frame.

2. A truck comprising a wheeled frame, skid-forming members rotatably mounted on opposite sides of the frame and having their upper faces, when the members are in intermediate position, substantialy continuous with the surface of the frame, means on the members to prevent overturning of the truck when said members act as skids, means to elevate the members and means to releasably lock the members in elevated position.

HENRY J. ANDREWS.
JOHN M. LANDENBERGER.